Jan. 31, 1967   O. JENSEN   3,302,086
ROTOR RESISTANCE CONTROL CIRCUIT FOR REVERSIBLE A.-C. MOTORS
Filed Jan. 17, 1964   2 Sheets-Sheet 1

INVENTOR.
OTTO JENSEN
BY
OSTROLENK, FABER, GERB & SOFFEN
ATTORNEYS

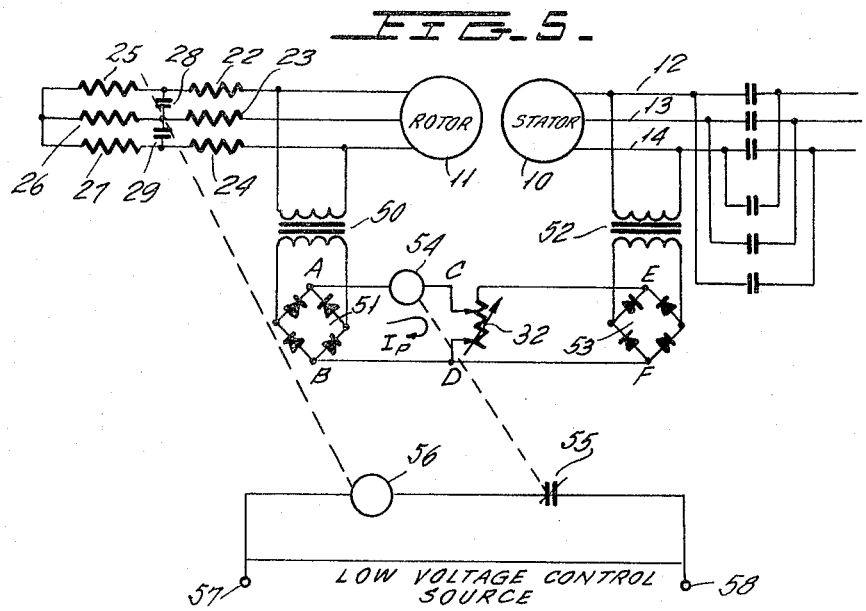

United States Patent Office 3,302,086
Patented Jan. 31, 1967

3,302,086
ROTOR RESISTANCE CONTROL CIRCUIT FOR REVERSIBLE A.-C. MOTORS
Otto Jensen, Malvern, Pa., assignor to I-T-E Circuit Breaker Company, Philadelphia, Pa., a corporation of Pennsylvania
Filed Jan. 17, 1964, Ser. No. 338,499
5 Claims. (Cl. 318—210)

This invention relates to a novel motor control system, and more specifically relates to a relay system for sensing a plugging condition in a three-phase induction motor and automatically adjusting the rotor resistance.

Quick stopping or reversal or rotation of three-phase induction motors is sometimes effected by a method known as plugging, which consists of applying three-phase power having a reversed phase sequence to the stator of the machine, while the motor is still running in the forward direction.

During the plugging period, a retarding torque is developed by the motor and greater than normal current is drawn by the stator. It is desirable to increase the plugging torque and to decrease the stator current during the plugging period. This can be done by adjusting the secondary resistance of the motor to a suitable value. The value of secondary resistance necessary for optimum plugging performance is, in general, different from the value necessary for running conditions. Therefore, the plugging controls must include means for adjusting the secondary resistance when the motor is being plugged.

In traction applications, such as bridge and trolley drives for travelling cranes, the motor may be subjected to reversing duty, in which plugging is used to stop and/or reverse from either direction. A plugging condition takes place every time the motor is energized to run in a certain direction while it is still running in the opposite direction.

The present invention provides a novel system for detecting the existence of a plugging condition and to change, automatically, the value of the external resistance connected to the rotor circuit of the motor.

In accordance with the invention, the stator voltage and rotor voltage are compared to one another, and when a difference is measured which indicates a plugging condition, a relay in the rotor circuit is operated to change the rotor resistance. More specifically, the voltage induced in the rotor circuit has a magnitude proportional to the slip, i.e., the difference in speed between the rotating magnetic field produced by the stator currents and the rotating rotor. When the motor is running normally, in either direction, the rotor speed is only slightly lower than the speed of the rotating magnetic field. The slip is low, and therefore, the voltage induced in the rotor is low. When the motor is plugged, the direction of rotation of the magnetic field due to the stator currents is reversed, while the rotor is still running in the original direction. The slip changes from a small fraction of synchronous speed to almost twice synchronous speed, and the voltage induced in the rotor makes a corresponding change. This change in voltage may then be used to pass current through a suitable relay coil which causes the subsequent operation of relay contacts which control the rotor resistance. It is recognized that in an actual circuit, the voltage between the slip rings will be smaller than the induced rotor voltage by an amount which depends on the value of the external resistance in the rotor circuit. This, however, could be suitably compensated in the comparing circuit.

As a further important advantage of the invention, the complete assembly, including all plugging equipment, may be carried on the complete moving unit such as a carriage which receives its electrical energy from suitable trolley rails in the usual manner.

Accordingly, a primary object of this invention is to automatically adjust rotor resistance during the plugging of an induction motor.

Another object of this invention is to provide a novel plugging relay which can be carried on the carriage of a hoist motor.

A still further object of this invention is to provide a plugging relay which automatically controls rotor resistance responsive to a plugging condition.

Yet another object of this invention is to provide a novel plugging relay circuit which has an extremely sharp cut-off point.

These and other objects of this invention will become apparent from the following description when taken in connection with the drawings, in which:

FIGURE 1 schematically illustrates a first embodiment of the invention.

FIGURE 5 shows a further embodiment of the invention wherein a pilot relay is used to control a main relay.

FIGURE 6 is a schematic diagram of voltage, current and rotor speed for explaining the operation of the invention.

Figure 1:
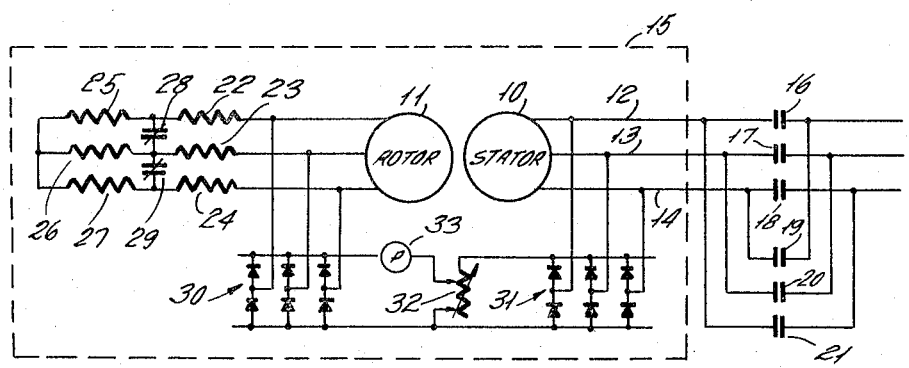

Referring first to FIGURE 1, I have illustrated therein a typical three-phase induction motor having a stator winding 10 and rotor winding 11. Stator winding 10 is electrically connected to a three-phase power source over the conductors 12, 13 and 14. The conductors 12, 13 and 14 can, if desired, be included in trolley rails which carry the complete assembly schematically illustrated within the dotted box 15 where, for example, the motor is supported from rails 12, 13 and 14 by rolling conductors, or the like.

A control contactor is then provided in series with conductors 12, 13 and 14 which can, for example, have contacts 16, 17 and 18 for causing rotor rotation in a first direction, and contacts 19, 20 and 21 for causing rotor rotation in an opposite direction.

The rotor 11 is then provided with resistors 22, 23 and 24, and a further set of resistors 25, 26 and 27 respectively. A pair of relay contacts 28 and 29 are then connected between the sets of resistors 25 through 27 and 22 through 24 for normally short circuiting resistors 25 through 27.

A three-phase bridge connected rectifier 30 is then connected to the rotor circuit, while a second three-phase bridge connected rectifier 31 is connected to the stator circuit. The rectified output voltages of each of rectifiers 30 and 31 are then connected in opposing relationship with one another to the adjustable resistor 32. The rectifier 30 and resistor 32 are further connected in series with relay winding 33, which is the relay coil for operating relay contacts 28 and 29. It is to be noted that both the rotor and stator circuits are connected to adjustable resistor 32 by suitable sliding connectors (or a tap arrangement) to adjust for the reduced rotor slip ring voltage from the theoretical voltage induced in the rotor.

When the relay 33 is deenergized, contacts 28 and 29 will be closed, as shown, while energization of relay 33 will cause the opening of contacts 28 and 29, and, thus, the insertion of additional resistors 25, 26 and 27 in the rotor circuit.

As previously indicated, during normal operating conditions with the rotor 11 being at approximately synchronous speed or less than synchronous speed, the induced voltage in rotor 11 will be smaller than the voltage output of stator 10. Thus, the output voltage of rectifier 31 will be greater than the output voltage of rectifier 30, whereby no current flows through coil 33. When, however, a plugging condition occurs as caused, for example, by the closure of contacts 19, 20 and 21 and the opening of contacts 16, 17 and 18, the output voltage of rotor 11 will exceed the voltage of stator 10, whereby the voltage of rectifier 30 will be greater than the output voltage of rectifier 31. Therefore, a current will flow from rectifier 30 through coil 33 and resistor 32 to energize coil 33. This, in turn, causes the opening of contacts 28 and 29, and thus the automatic insertion of additional resistors 25, 26 and 27 in the rotor circuit which serve to cut down what would be an excessive current flow in the rotor circuit due to plugging.

In the circuit of FIGURE 1, the rectifiers 30 and 31 were three-phase bridge connected rectifiers. It will, however, be understood that other types of rectification could be used such as that shown in FIGURE 2 where single phase bridge connected rectifiers 40 and 41 connected to two phases serve the purpose of rectifiers 30 and 31 of FIGURE 1. In all other respects, the operation of the circuit of FIGURE 2 will be identical to that of FIGURE 1.

Figure 2:
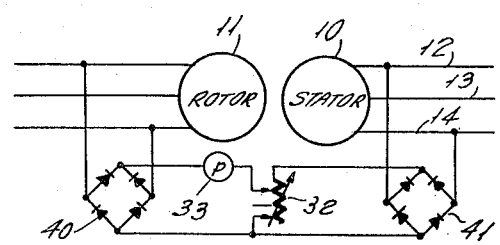
FIGURE 2 illustrates a modification of the circuit of FIGURE 1.

In FIGURES 1 and 2, it has been presumed that the turns ratio of the windings of stator 10 and rotor 11 are in a one-to-one ratio. In the event that there is some other ratio, it will be understood that a suitable transformer such as autotransformer 50 of FIGURE 3 could be inserted, for example, between the rotor circuit and the bridge connected rectifier 30 to make a suitable adjustment for the turns ratio difference. In all other respects, the circuit of FIGURE 3 will be identical to that of FIGURE 1.

Figure 3:
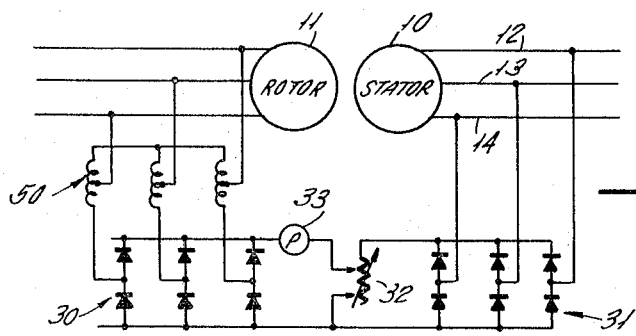
FIGURE 3 shows a further possible modification of the circuit of FIGURE 1 where the turns ratio between the stator and rotor windings is different from a one-to-one ratio.
Figure 4:
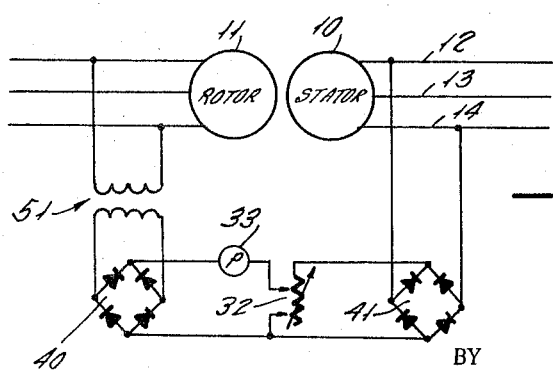
FIGURE 4 shows a modification of the arrangement of FIGURE 3.

It will also be understood that the turns ratio correction transformer 50 of FIGURE 3 could also be applied in the case of the circuit of the type shown in FIGURE 2. Thus, FIGURE 4 illustrates the insertion of a turns ratio correcting transformer 51 between the rotor circuit and the single phase bridge connected rectifier 40 of FIGURE 2.

In the embodiments of FIGURES 1 through 4, the relay contacts 28 and 29 are closed when the relay coil 33 is deenergized. While this arrangement would perform satisfactorily, contact pressure for contacts 28 and 29 must be derived from gravity or spring tension, or the like. This is a disadvantage in many applications since heavy current is carried in the rotor circuit during the plugging operation and would require a relatively heavy contactor or relay. Therefore, the relay coil 33 would have to use considerable energy which, in turn, would require larger rectifiers for rectifier 30 and 31.

The arrangement shown in FIGURE 5 eliminates many of these disadvantages and renders the relay extremely sensitive with a sharp cut-off type operation.

Referring to FIGURE 5, components similar to those of FIGURE 1 have been given similar identifying numerals. In FIGURE 5, however, the output voltage of rotor 11 is connected through an isolating transformer 50 to a single phase bridge connected rectifier 51. In a similar manner, the output voltage of stator 10 is connected through transformer 52 to a single phase bridge connected rectifier 53. Note that if a turns ratio correction is required, this could be accomplished through transformers 50 and 52.

The rectifiers 51 and 53 are then connected in an opposing relation with the resistor 32, while the relay coil 33 of FIGURE 1 has now been replaced by an extremely sensitive pilot relay 54. The sensitive relay 54 then has a relay contact 55 associated therewith, which is a normally closed contact, and which is connected in series with relay coil 56 which has normally open contacts 28 and 29 associated therewith. A low voltage control source connected to terminals 57 and 58 is then connected in series with contact 55 and coil 56.

Under normal or non-plugging operation, the relay coil 54 is deenergized so that contact 55 is closed. Therefore, control current flows through coil 56 to close contacts 28 and 29, thereby normally short circuiting resistors 25, 26 and 27.

During plugging operation, the relay coil 54 is energized, thus opening contact 55 which deenergizes coil 56 and thus opens contacts 28 and 29 to insert resistors 25, 26 and 27 in the rotor circuit.

It is to be particularly noted that any high current duty required by relay coil 56 to maintain contacts 28 and 29 closed has been removed from the control portion of the system. Therefore, design considerations concerning the sensitivity of relay 54 are simplified since this relay is removed from the relatively high current carrying duty which is assumed in FIGURE 1.

The high sensitivity of this relay scheme using the common resistor 32 and opposing rectifiers can be understood by a consideration of the operation thereof, as illustrated in FIGURE 6. Referring now to FIGURE 6, I have illustrated therein the operating characteristics of relay 54 where the horizontal axis represents per unit voltage with 1.0 volt representing the rated stator voltage. The upper vertical axis represents current, while the negative vertical axis represents rotor speed in a per unit calibration. Thus, the rotor speed of 1.0 represents the synchronous rotor speed.

The voltage induced in the rotor circuit is shown in the fourth quadrant of FIGURE 6 where it is seen that the voltage $V_{rotor}$ varies linearly with rotor speed. At synchronous speed (+1.0 per unit), the induced voltage in the rotor is zero. When the rotor is at standstill (0.0 per unit speed) the induced voltage in the rotor is 1.0 per unit. At synchronous speed in the negative direction (−1.0 per unit), the induced voltage in the rotor is seen to be 2.0 per unit. The voltage in the stator shown as $V_{stator}$ is seen to have a constant value over the whole speed range. Note that where the motor has a one-to-one transformer ratio, the rotor voltage at standstill will be exactly equal to the stator voltage. Clearly, if the ratio is different from unity, suitable transformer ratios, for example, for transformers 50 and 52 of FIGURE 5, will be selected to make the rectifier voltages equal at the standstill point.

The line $R_{32}$ in the first quadrant of FIGURE 6 represents the resistance characteristic of resistor 32 of FIGURE 5. During plugging, the rotor speed will be between zero and −1.0 so that the rotor voltage will be greater than the stator voltage. Thus, the rectified voltage $V_{AB}$ is greater than $V_{EF}$, where the points A through F are identified in FIGURE 5. Under this condition, current will flow from point A through relay 54, resistor 32, and back to point B. There will then be a voltage drop $V_{AC}$ caused by the current flowing through relay 54 and, therefore, the voltage applied to resistor 32 ($V_{CD}$) will be slightly smaller than $V_{AB}$. As long as the voltage $V_{CD}$ is greater than the voltage $V_{EF}$ there will be no current flow in the path C–E because such current flow will be blocked by the rectifier 35. As the rotor speed reduces, the voltage $V_{AB}$ becomes smaller and the current in resistor 32, which is also the relay current, reduces along the line $R_{32}$ in FIGURE 6.

When the rotor speed becomes zero, $V_{AB}$ becomes equal to $V_{EF}$. $V_{CD}$ will be slightly smaller than $V_{EF}$. Therefore, at zero speed $V_{CD}$ will be almost equal to $V_{AB}$ and the current in relay coil 54 will decrease.

For positive rotor speeds $V_{AB}$ will be smaller than $V_{CD}$ so that current flow through relay coil 54 will be blocked by the rectifier 51.

By making the resistance of relay 54 very small, it is clear that the voltage drop $V_{AC}$ will also be small so that a very small change in rotor speed near the zero value will cause the relay current to drop from the pickup value $I_p$ of FIGURE 6 down to zero, as shown in the solid lines. This short cut-off is, of course, a very desirable feature, and prevents ambiguous operation of the relay structure.

Although this invention has been described with respect to its preferred embodiments, it will be understood that many variations and modifications will now be obvious to those skilled in the art, and it is preferred therefore that the scope of the invention be limited not by the specific disclosure herein, but only by the appended claims.

The embodiments of the invention in which an exclusive privilege or property is claimed are defined as follows:

1. In combination; a reversible A.-C. motor having a rotor winding, a stator winding, impedance means connected to said rotor winding, and a plugging relay for changing the value of said impedance means responsive to a plugging condition; said plugging relay comprising comparator circuit means connected to said stator winding and said rotor winding, a relay coil connected to said comparator circuit means, and relay contacts for said relay coil operatively connected to said impedance means; said relay contacts being operable from a first to a second position for changing the value of said impedance means from a first value to a second value; said relay contacts being in said first position when said relay coil is deenergized and being moved to said second position when said relay coil is energized; said relay coil being normally deenergized by said comparator means when the voltage of said stator exceeds the voltage of said rotor; said relay coil being energized responsive to the rotor voltage exceeding said stator voltage; said comparator means comprising a first rectifier means connected to said stator winding, a second rectifier connected to said rotor winding and a resistor means continuously connected in parallel with said first rectifier and in series with said second rectifier and said relay coil; said rectifiers being connected in series opposition to one another.

2. The combination of claim 1 which further includes a second relay; said second relay having a second relay winding, said relay contact being deenergized by said second relay winding and being normally closed in said second position when said second relay winding is energized; a control voltage source; said relay coil having a pair of normally closed pilot relay contacts; said pilot relay contacts being connected in series with said second relay winding and said control voltage source.

3. The combination of claim 1 wherein said combination is carried on a movable carriage connected to the conductors extending to said stator.

4. The combination of claim 1 wherein said motor is a three-phase A.-C. induction motor.

5. The combination of claim 1 which further includes transformer means; said connection between at least one of said rotor or stator to said first or second rectifier respectively including said transformer therein.

References Cited by the Examiner

UNITED STATES PATENTS

| | | | |
|---|---|---|---|
| 2,131,607 | 9/1938 | Wade | 318—210 |
| 2,165,491 | 7/1939 | Leitch | 318—210 |

FOREIGN PATENTS 1,066,407  1/1954  France.

ORIS L. RADER, *Primary Examiner.*

G. Z. RUBINSON, *Assistant Examiner.*